UNITED STATES PATENT OFFICE.

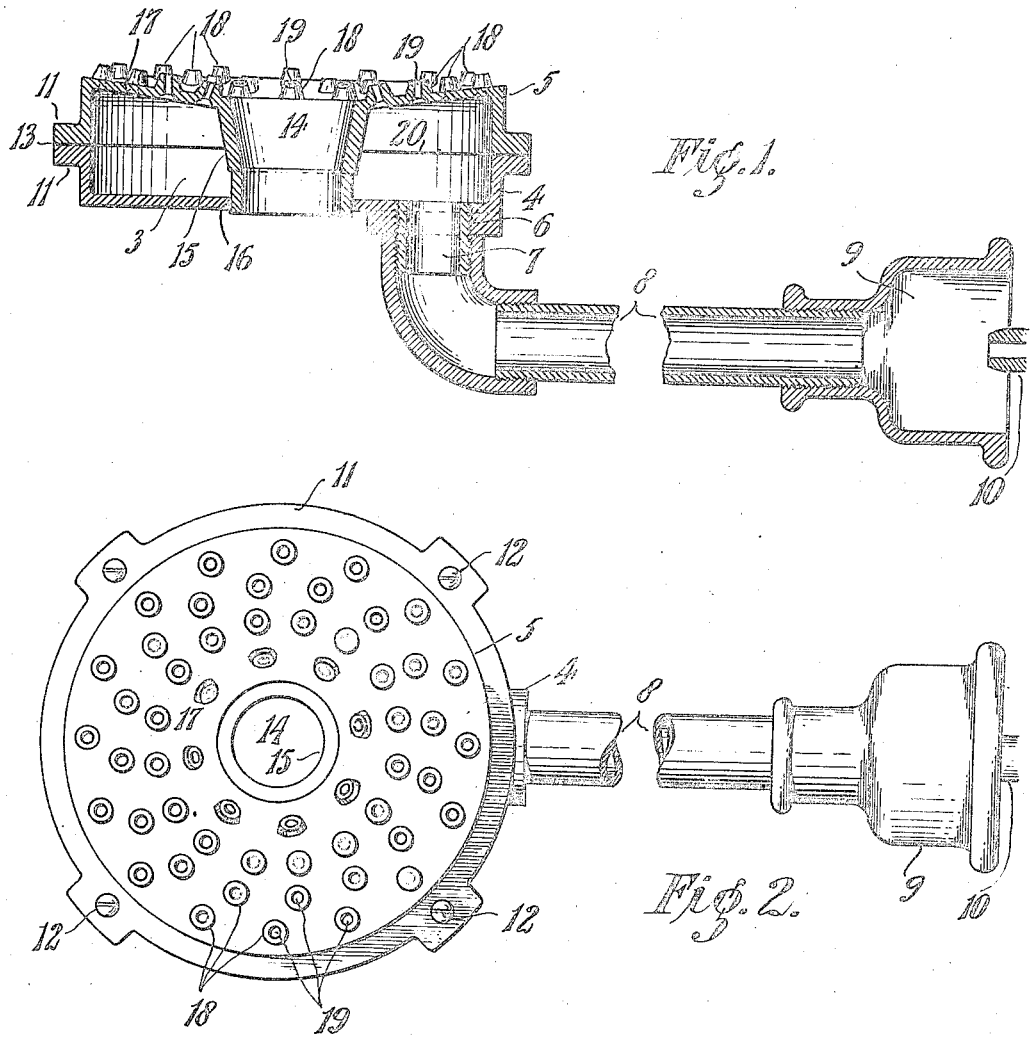

WILLIAM L. SHAND AND ALEXANDER McDONALD SHAND, OF CAULFIELD, NEAR MELBOURNE, VICTORIA, AUSTRALIA, ASSIGNORS OF ONE-HALF TO CHARLES COLUMBINE JACKSON, OF MELBOURNE, VICTORIA, AUSTRALIA.

GAS-BURNER FOR HEATING, COOKING, AND OTHER PURPOSES.

1,397,662.   Specification of Letters Patent.   Patented Nov. 22, 1921.

Application filed April 12, 1920. Serial No. 373,363.

*To all whom it may concern:*

Be it known that we, WILLIAM LAING SHAND and ALEXANDER McDONALD SHAND, subjects of the King of Great Britain and Ireland, residing at Caulfield, near Melbourne, in the State of Victoria, Commonwealth of Australia, have invented certain new and useful Improvements in Gas-Burners for Heating, Cooking, and other Purposes, of which the following is a specification.

This invention relates to gas burners used for heating and cooking purposes, and it has for its object the provision of a highly efficient and economical burner wherein the heating properties of the gas are utilized to the utmost and as a consequence considerable economy in gas consumption is effected.

A burner according to the invention is characterized by having means for mixing gas and air to form a combustible mixture, means for continuously pre-heating the mixture, combustion jets for the pre-heated mixture, and means for the introduction to the flames issuing from said jets after combustion of warm air by natural draft to aid in complete combustion of the fuel.

The invention embodies a mixing and heating chamber having a central air passageway therethrough, means for admitting partially admixed air and gas into said chamber, and a series of escape outlets through the top of said chamber. Several of these escape outlets are vertically arranged, while those which immediately surround the central air passageway are inwardly inclined.

The burner is also furnished with means to obviate any back-firing.

The invention is illustrated in the accompanying drawings, wherein:—

Figure 1 shows in longitudinal section the improved burner, and

Fig. 2 is a plan of Fig. 1 showing the preferred disposition of the gas outlet holes.

In these drawings the numeral 3 indicates a combined mixing and heating chamber which is constructed in two halves or parts 4 and 5. The lower part 4 of said chamber is bored and screw-threaded at 6 to receive a nipple 7 to which is attached a fuel supply pipe 8.

The fuel supply pipe 8 has formed at its outer end an open mouthed and cup-shaped chamber 9 to receive the ordinary gas supply nipple 10 and for the introduction of air annularly around said nipple.

The upper and lower parts of the heating and mixing chamber 3 have mating flanges 11 which are clamped together by means of screws 12, packing 13 being inserted between said flanges to insure a gas-tight joint.

A central air passageway 14 is formed through said mixing and heating chamber 3 by providing a tube 15 depending from the top part 5 of said chamber and an orifice 16 in the lower part 4 of said chamber, adapted to receive said tube 15.

The upper surface of the top member 5 of said mixing and heating chamber has a concave formation, as illustrated and indicated by 17.

On the upper surface of said chamber 3 there are formed a series of nipples 18 furnished with gas escape outlets 19. These nipples are preferably formed on the concave portion 17 of the heating and mixing chamber surface and are arranged in concentric rings, as illustrated in Fig. 2.

The gas escape outlets 19 immediately surrounding the central air passageway 14 are inclined inwardly, while the remainder of the series of said outlets are in vertical relationship with the sides of said chamber 3.

A strip of wire gauze 20 may be interposed between the upper and lower parts 5 and 4 of the heating and mixing chamber 3. This wire gauze is held in position between the mating flanges 11 and the screws 12 and it functions to obviate liability of back-firing particularly in those cases when the length of the fuel supply pipe 8 is necessarily small as in the use of the burner in a bath-heater construction and in similar applications.

In use, the flow of gas into the fuel supply pipe 8 draws air into said pipe through the chamber 9 and a mixture of gas and air is conducted to the chamber 3 wherein the mixture circulates, becomes thoroughly admixed, is heated and then escapes as a preheated combustible mixture through the outlets 19 of the nipples 18 where combustion takes place.

Following combustion of the gas, a current of air is drawn through the passageway 14, expands and is heated by the converging flames emerging from the ring of outlets 19 immediately surrounding said air passageway. These outlets by reason of their inward inclination further function to direct flames to the center of a vessel being heated.

Owing to the upper surface of the chamber 3 being of concave formation, any liquid falling thereupon gravitates to and escapes through the passageway 14, while the construction of nipples 18 minimizes the danger of foreign substances entering and blocking the gas escape outlets 19.

The wire gauze partition 20 between the two parts of the chamber 3 effectually prevents any back-firing and in addition it assists in the obtainment of an efficient admixture of gas and air prior to combustion.

What we do claim is:—

1. A burner for heating and cooking purposes characterized by having a combined heating and mixing chamber; said chamber comprising an upper casing, a lower casing, mating flanges on said casings; means detachably clamping said flanges together, packing inserted between said flanges, a gauze partition in said chamber; a central air passageway through said chamber; means for the partial admixture of gas and air; means for conducting such partially admixed fuel to said chamber, nipples formed on the upper surface of said chamber and surrounding said air passageway, and holes in said nipples arranged so that those adjacent to the central air passageway are inclined toward the latter.

2. A burner for heating and cooking purposes comprising a combined mixing and heating chamber formed in two parts detachably secured together, a central air tube depending from the upper part of said chamber, a central orifice in the lower part of said chamber to receive said tube, a concave upper surface on said upper part, nipples formed on said concave upper surface, fuel escape outlets in said nipples the innermost of said outlets being inclined axially, a fuel supply pipe, means for detachably connecting said pipe to the lower portion of said mixing and heating chamber, and a cup-shaped chamber at the outer end of the fuel supply pipe and annularly surrounding the gas nipple.

In testimony whereof we affix our signatures in presence of two witnesses.

WM. L. SHAND.
A. McDONALD SHAND.

Witnesses:
 JAMES H. ANDERSON,
 R. BOULTON.